United States Patent Office.

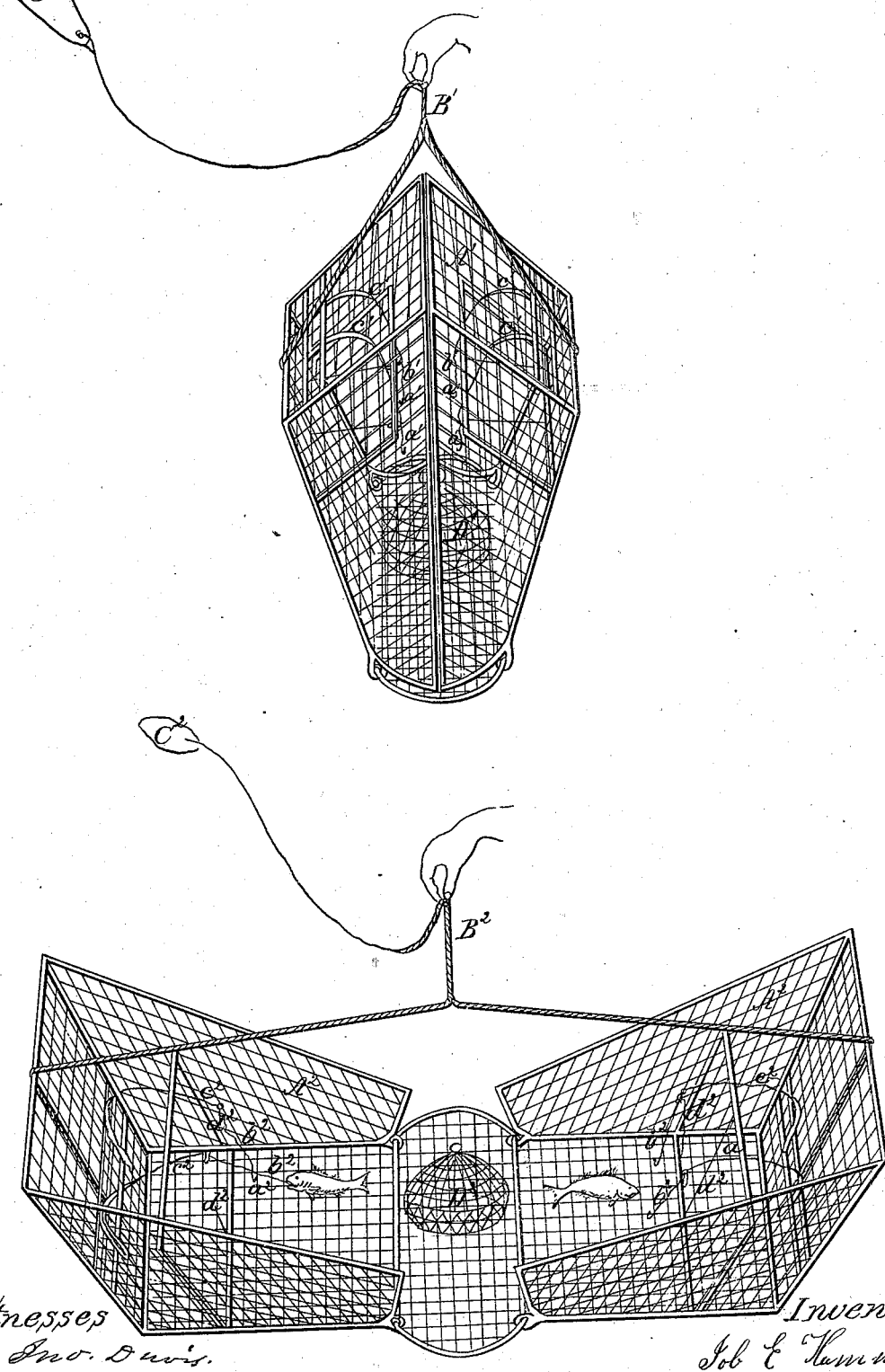

JOB E. HAMMOND, OF NEW BEDFORD, MASSACHUSETTS.

Letters Patent No. 113,292, dated April 4, 1871; antedated March 24, 1871.

---

IMPROVEMENT IN FISH-TRAPS.

---

The Schedule referred to in these Letters Patent and making part of the same.

---

*To all whom it may concern:*

Be it known that I, JOB E. HAMMOND, of New Bedford, in the county of Bristol in the State of Massachusetts, have invented a new and improved "Fish-Trap;" and I do hereby declare that the following is a full and exact description thereof, reference being had to the accompanying drawings and to the letters of reference marked thereon.

My invention consists in a fish-trap in form of a valise, with snoods, hooks, springs, and bait-basket.

To enable others skilled in the art to make and use my invention, I will proceed to describe its construction and operation.

Figure 1 is a perspective view of my invention.

Figure 2 is a view of my invention open, as seen when set for the catching of fish.

Fig. 1—

$A^1$ is the trap.

$B^1$, the line, which extends from the trap to the surface of the water.

$C^1$, the buoy attached to the line.

$D^1$, the bait-basket.

Fig. 2—

$A^2 A^2$, the trap.

$B^2$, the line.

$C^2$, the buoy.

$D^2$, bait-basket.

$a^2 a^2 a^2 a^2$, hooks.

$b^2 b^2 b^2 b^2$, snoods.

$c^2 c^2 c^2 c^2$, springs.

$d^2 d^2 d^2 d^2$, catches, which hold down the springs.

The line $B^1$ is double, and passes around the trap, as will be seen by figs. 1 and 2, &c.

Operation.

The fish-trap being constructed as herein set forth, its operation may be noted. The fish seize the bait and thus liberate the catches, when the springs jerk the snoods and hook the fish as one would when fishing in the ordinary manner. Other fish striving to get the bait through the net-work of the "fish-basket," are caught in the trap when quickly closed by the line around it in raising it to the surface of the water, as will be plain without further specification.

Claim.

What I claim as my invention, and desire to secure by Letters Patent, is—

The fish-trap $A^2$, with springs $c^2 c^2 c^2 c^2$, snoods $b^2 b^2 b^2 b^2$, hooks $a^2 a^2 a^2 a^2$, and bait-basket $D^2$, all constructed, combined, and operating substantially as and for the purpose set forth and described.

JOB E. HAMMOND.

Witnesses:
JNO. DAVIS,
M. B. DAVIS.